T. McMahon,
Liquid Measure.
No. 99,454.  Patented Feb. 1, 1870.
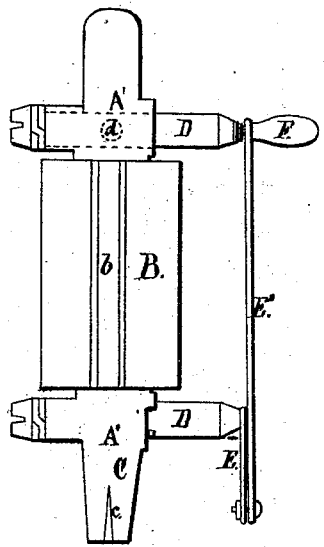
Fig: 1.
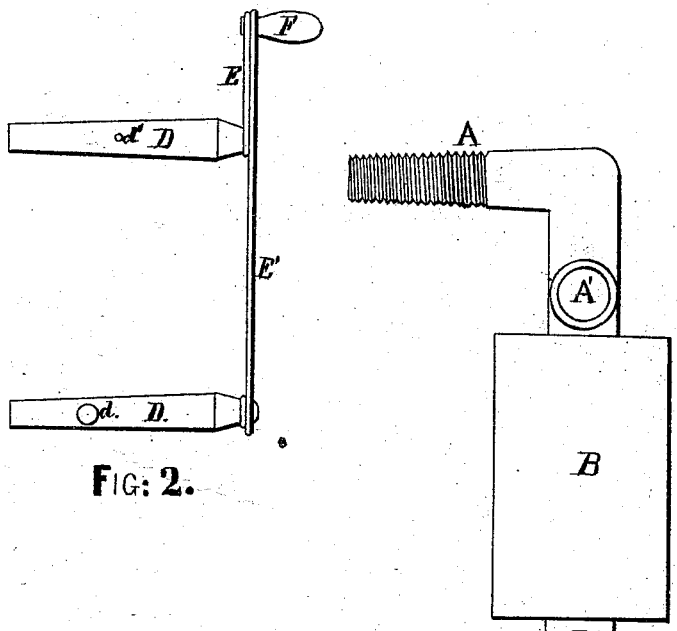
Fig: 2.
Fig: 3.
WITNESSES.
Edwin James.
Alf. Holmead Jr
INVENTOR.
Thomas McMahon.
per J. E. S. Holmead.
Attorney.

United States Patent Office.

THOMAS McMAHON, OF WILLIAMSBURG, NEW YORK.

Letters Patent No. 99,454, dated February 1, 1870.

IMPROVEMENT IN COMBINED FAUCET, MEASURE, AND FUNNEL.

The Schedule referred to in these Letters Patent and making part of the same.

*To all whom it may concern:*

Be it known that I, THOMAS McMAHON, of Williamsburg, in the county of Kings, and State of New York, have invented certain new and useful Improvements in Combined Faucets, Measures, and Funnels; and I do hereby declare that the following is a full, clear, and exact description of the same, reference being had to the accompanying drawing, and to the letters of reference marked thereon, making part of this specification, in which—

Figure 1 is a front view.

Figure 2 is a view showing the taps or plugs detached from their bowls, but connected by their operating-lever.

Figure 4 is a side view.

The nature of my invention consists in constructing a faucet with a measuring-chamber, having arranged, both above and below the same, a bowl and a tap or key. The taps or plugs are connected by a lever, so as to insure their simultaneous movement, and have their openings, through which the liquid passes, arranged at such relative positions to each other, that when the taps are seated in the bowls, the opening of the one shall close the other. The exit-mouth of the faucet is so constructed as to serve as a funnel.

To enable others skilled in the art to make and use my invention, I will now proceed to describe its construction and operation.

A represents that portion of the pipe or tube that is to be inserted in the cask or other vessel from which the liquids or fluids are to be drawn.

A' A' represent the bowls of the faucet, and are made slightly conical in form.

B is a measuring-chamber, arranged between the bowls A' A', and is provided with a gauge-face of glass, $b$.

C is the exit-tube, and is funnel-shaped, having vent-passages or recesses at $c\ c$.

D D are the taps or keys, and are tapering or conical in form, in order to properly fit and work in the bowls A' A'.

These taps or keys are provided with handles E E, and are so connected by a lever or arm, E', that the movement of the one necessitates the movement of the other.

$d\ d$ are openings in the plugs or keys, and are both in the line of the water-way, but arranged at such relative positions, when properly seated in the bowls, that when one is opened the other shall be closed, so that the faucet being inserted in a cask or other vessel, by simply turning the handle F, the valve between the measure B and exit-pipe or funnel C is closed, and the valve through which is conveyed the liquid from the cask to the chamber B, is opened. After the desired quantity of liquid is drawn, by simply moving the handle F in the opposite direction through the lever E', you shut off all communication with the cask, and open the exit.

$d'$ is a vent-opening, and is arranged at such position as to be clear of the water-way.

Thus, it will be seen, that at an exceedingly moderate cost, I provide a faucet that is secure and durable, and, also, one that combines all the advantages possessed by the ordinary faucet, measure, and funnel.

Having thus fully described my invention,

What I claim therein as new, and desire to secure by Letters Patent of the United States, is—

1. A faucet, having two bowls A A', and chamber B, and taps or keys D D, when the latter are united by a lever, E', and the whole are so combined and arranged as to operate substantially as described.

2. A faucet, having bowls A' A', chamber B, taps or keys D D, connected by lever E', and funnel-shaped exit-tube C, when the same are so combined and arranged as to operate substantially as described.

In testimony whereof, I have signed my name to this specification, in the presence of two subscribing witnesses.

THOS. McMAHON.

Witnesses:
WM. H. FULKERSON,
WM. H. EPWORTH.